United States Patent

Mc Cutchen, III et al.

[11] Patent Number: 6,086,140
[45] Date of Patent: Jul. 11, 2000

[54] LIGHT BAR AIR DEFLECTOR

[76] Inventors: William J. Mc Cutchen, III; Reed T. Davis, both of Rte. 3 Box 916, Bishopville, S.C. 29010

[21] Appl. No.: 09/213,126

[22] Filed: Dec. 17, 1998

[51] Int. Cl.⁷ .................................................. B62D 35/00
[52] U.S. Cl. ........................ 296/180.1; 296/217; 362/493
[58] Field of Search ............................. 296/180.1, 180.2, 296/180.4, 217, 95.1; 362/493, 479

[56] References Cited

U.S. PATENT DOCUMENTS

| | | | |
|---|---|---|---|
| 4,268,085 | 5/1981 | Sakai et al. | 296/217 |
| 4,320,919 | 3/1982 | Butler | 296/180.1 |
| 4,334,211 | 6/1982 | McConnell et al. | 340/88 |
| 4,447,086 | 5/1984 | Roos et al. | 296/217 |
| 4,480,869 | 11/1984 | Splithoff | 296/217 |
| 4,707,014 | 11/1987 | Rich | 296/180.1 |
| 4,750,782 | 6/1988 | Turner | 296/217 |
| 4,934,754 | 6/1990 | Cioffi | 296/217 |
| 5,253,829 | 10/1993 | Willey | 296/217 |

FOREIGN PATENT DOCUMENTS

| | | | |
|---|---|---|---|
| 2447846 | 10/1980 | France | 296/180.2 |
| 2755476 | 6/1978 | Germany | 296/180.2 |

*Primary Examiner*—D. Glenn Dayoan
*Assistant Examiner*—Chad D Wells

[57] ABSTRACT

A light bar air deflector for deflecting air around a light bar located on the roof of a vehicle, such as a police vehicle. The light bar air deflector includes a base portion with a deflecting portion upwardly and outwardly extending from a back edge of the base portion at an obtuse angle from the base portion.

13 Claims, 2 Drawing Sheets

LIGHT BAR AIR DEFLECTOR

BACKGROUND OF THE INVENTION

1. Field of the Invention

The present invention relates to air deflectors and spoilers and more particularly pertains to a new light bar air deflector for deflecting air around a light bar located on the roof of a vehicle, such as a police vehicle.

2. Description of the Prior Art

The use of air deflectors and spoilers is known in the prior art. More specifically, air deflectors and spoilers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,253,829 by Willey; U.S. Pat. No. 4,447,086 by Roos et al.; U.S. Pat. No. Des. 252,508 by Wiley, Jr.; U.S. Pat. No. 5,639,142 by Willey; U.S. Pat. No. 3,156,175 by Werner; and U.S. Pat. No. 3,311,406 by Fritsch.

While these devices fulfill their respective, particular objectives and requirements, the aforementioned patents do not disclose a new light bar air deflector. The inventive device includes a base portion with a deflecting portion upwardly and outwardly extending from a back edge of the base portion at an obtuse angle from the base portion.

In these respects, the light bar air deflector according to the present invention substantially departs from the conventional concepts and designs of the prior art, and in so doing provides an apparatus primarily developed for the purpose of deflecting air around a light bar located on the roof of a vehicle, such as a police vehicle.

SUMMARY OF THE INVENTION

In view of the foregoing disadvantages inherent in the known types of air deflectors and spoilers now present in the prior art, the present invention provides a new light bar air deflector construction wherein the same can be utilized for deflecting air around a light bar located on the roof of a vehicle, such as a police vehicle.

The general purpose of the present invention, which will be described subsequently in greater detail, is to provide a new light bar air deflector apparatus and method which has many of the advantages of the air deflectors and spoilers mentioned heretofore and many novel features that result in a new light bar air deflector which is not anticipated, rendered obvious, suggested, or even implied by any of the prior art air deflectors and spoilers, either alone or in any combination thereof.

To attain this, the present invention generally comprises a base portion with a deflecting portion upwardly and outwardly extending from a back edge of the base portion at an obtuse angle from the base portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new light bar air deflector apparatus and method which has many of the advantages of the air deflectors and spoilers mentioned heretofore and many novel features that result in a new light bar air deflector which is not anticipated, rendered obvious, suggested, or even implied by any of the prior art air deflectors and spoilers, either alone or in any combination thereof.

It is another object of the present invention to provide a new light bar air deflector which may be easily and efficiently manufactured and marketed.

It is a further object of the present invention to provide a new light bar air deflector which is of a durable and reliable construction.

An even further object of the present invention is to provide a new light bar air deflector which is susceptible of a low cost of manufacture with regard to both materials and labor, and which accordingly is then susceptible of low prices of sale to the consuming public, thereby making such light bar air deflector economically available to the buying public.

Still yet another object of the present invention is to provide a new light bar air deflector which provides in the apparatuses and methods of the prior art some of the advantages thereof, while simultaneously overcoming some of the disadvantages normally associated therewith.

Still another object of the present invention is to provide a new light bar air deflector for deflecting air around a light bar located on the roof of a vehicle, such as a police vehicle.

Yet another object of the present invention is to provide a new light bar air deflector which includes a base portion with a deflecting portion upwardly and outwardly extending from a back edge of the base portion at an obtuse angle from the base portion.

Still yet another object of the present invention is to provide a new light bar air deflector that may be mounted on the roofs of emergency vehicle, such as police cars, ambulances, wreckers, and fire-fighting vehicles, in front of their emergency light bars to reduce wind drag on the vehicle caused by the light bar.

Even still another object of the present invention is to provide a new light bar air deflector that helps increase fuel efficiency of the vehicle while still permitting visibility of the light bar through the air deflector.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
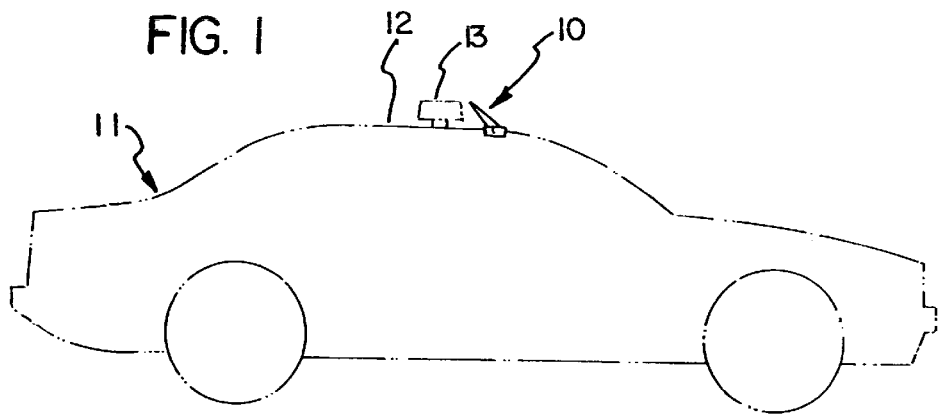
FIG. 1 is a schematic side view of a new light bar air deflector in use mounted to the roof of a vehicle in front of the light bar according to the present invention.

With reference now to the drawings, and in particular to FIGS. 1 through 4 thereof, a new light bar air deflector embodying the principles and concepts of the present invention and generally designated by the reference numeral 10 will be described.

As best illustrated in FIGS. 1 through 4, the light bar air deflector 10 generally comprises a base portion with a deflecting portion upwardly and outwardly extending from a back edge of the base portion at an obtuse angle from the base portion.

In use, the light bar air deflector 10 is designed for use on a vehicle 11 has a front, a rear, a pair of sides, a generally horizontal roof 12, and a light bar 13 mounted to the roof of the vehicle and extending between the sides of the vehicle. In closer detail, the air deflector comprises a base portion 14 having substantially flat top and bottom faces 15,16, a pair of opposite ends 17,18, and front and back edges 19,20 extending between the ends of the base portion.

The top and bottom faces of the base portion preferably lie in generally parallel planes to one another. Preferably, the top face of the base portion has a tapered region 21 adjacent the front edge of the base portion and converging towards the bottom face of the base portion. The tapered region of the top face of the base portion and the bottom face of the base portion lie in planes defining an acute angle therebetween. Preferably, the acute angle defined between the planes of the tapered region of the top face of the base portion and the bottom face of the base portion is between about 5 degrees and about 45 degrees. Ideally, the acute angle defined between the planes of the tapered region of the top face of the base portion and the bottom face of the base portion is about 20 degrees.

Ideally, the bottom face of the base portion has a downwardly extending flared region 22 adjacent the front edge of the base portion. The flared region of the bottom face and the tapered region of the top face converge together at the front edge of the base portion. The flared region of the bottom face and the tapered region of the top face each has a width defined from the front edge of the base portion in a direction towards the back edge of the base portion. The width of the tapered region of the top face is greater than the width of the flared region of the bottom face. Ideally, the width of the tapered region of the top face is at least three time greater than the width of the flared region of the bottom face.

In use, the bottom face of the base portion is designed for mounting to a roof of vehicle in front of a light bar mounted to the roof of the vehicle and extending between a pair of sides of the vehicle with one of the ends of the base portion positioned adjacent one of the sides of the vehicle and the other of the ends of the base portion positioned adjacent the other of the sides of the vehicle. Preferably, Ideally, the bottom face of the base portion is designed for adhesively coupling to the roof the vehicle in front of the light bar of the vehicle. In this preferred embodiment, an adhesive strip 23 is provided on the bottom face of the base portion and extending between the ends of the base portion. In use, the adhesive strip is designed for adhesive attachment to the roof of the vehicle.

Preferably, the base portion has a pair of outwardly and downwardly extending mounting flange regions 24,25. A first of the mounting flange regions is positioned adjacent a first of the ends of the base portion. A second of the mounting flange regions is positioned adjacent a second of the ends of the base portion. The mounting flange regions each are extended at an obtuse angle to the base portion. In use, the mounting flange regions each are designed for extending downwardly towards the adjacent side of the vehicle.

Figure 4:
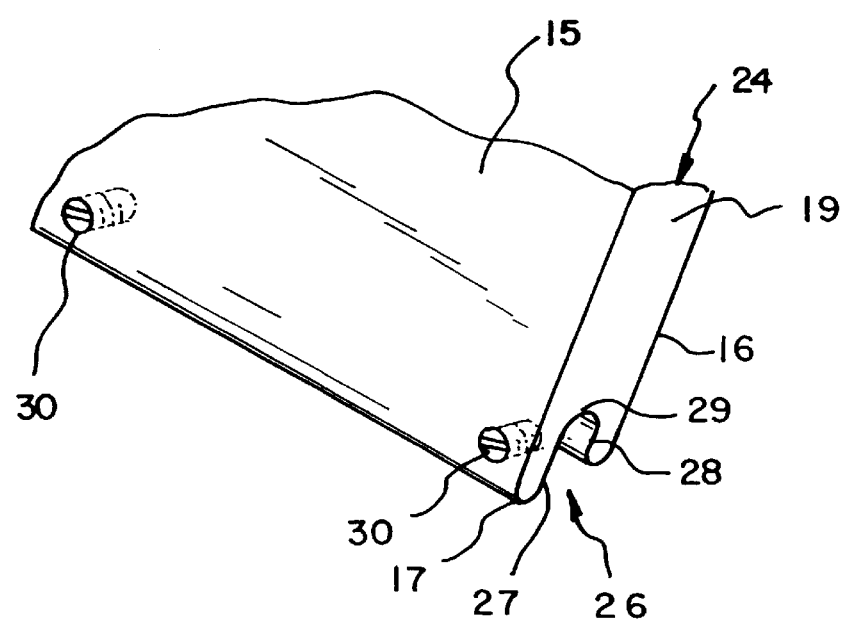
FIG. 4 is a schematic enlarged perspective view of the present invention taken from the circle 4 on FIG. 2.

The ends of the base portion each have a mounting channel 26 therein extending between the front and back edges of the base portion. In use, each of the mounting channels is designed for receiving therein a portion of a window jam of the adjacent side of the vehicle. With reference to FIG. 4, the mounting channels each are generally U-shaped and has a spaced apart pair of generally straight sides 27,28 and an arcuate middle portion 29 connecting the associated sides of the respective mounting channel together. The sides of each mounting channel are extended substantially parallel to each other. The sides of the mounting channel also lie in planes extending substantially parallel to the top and bottom faces of the base portion in the adjacent associated mounting flange region. Each of the sides of each mounting channel has a depth defined between the associated end of the base portion and the associated middle portion of the respective mounting channel. Ideally, the depth of one side of each mounting channel is greater than the depth of the other side of the respective mounting channel.

Each of the mounting flange regions has a pair of bores extending into the associated mounting channel from the top face of the base portion. Each of the bores has a threaded fastener 30 extended therethrough into the associated mounting channel. In use, the threaded fasteners are designed for tightening against the portion of the window frame of the vehicle inserted into the associated mounting channel to hold the associated portion of the window frame in the associated mounting channel.

Figure 2:
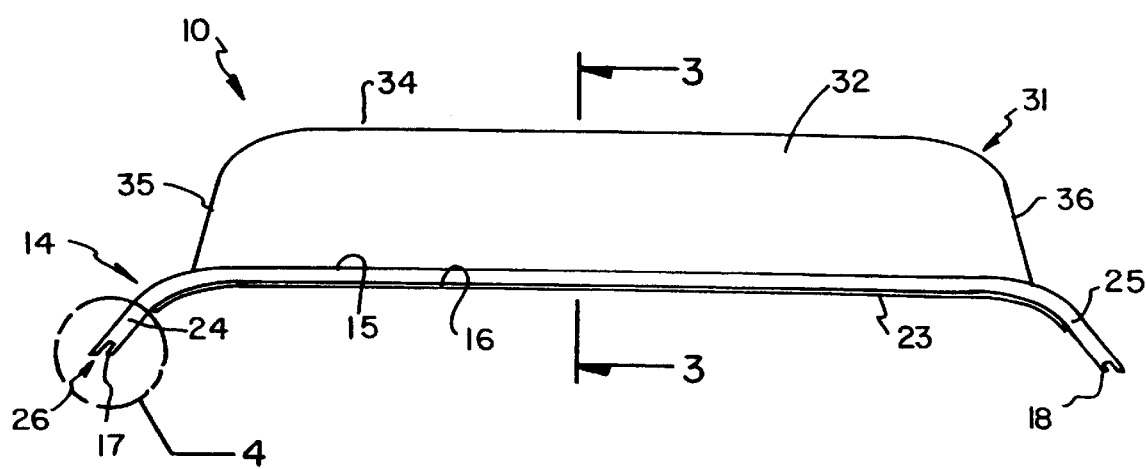
FIG. 2 is a schematic front view of the present invention.
Figure 3:
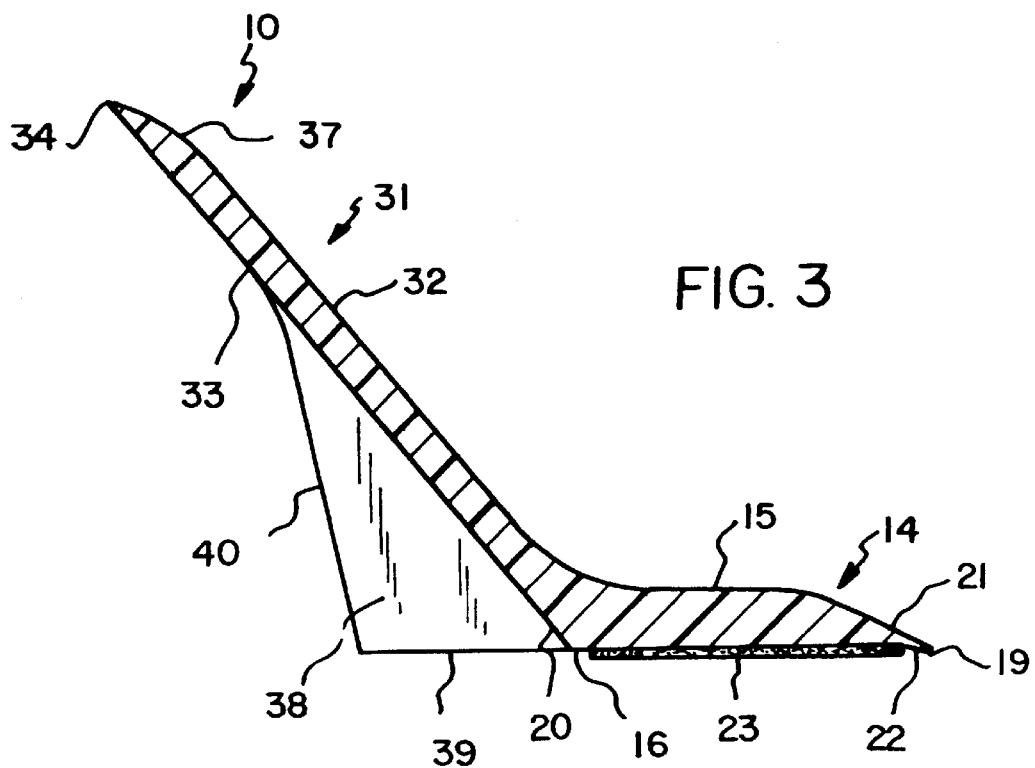
FIG. 3 is a schematic cross sectional view of the present invention taken from line 3—3 of FIG. 2.

With particular reference to FIGS. 2 and 3, a deflecting portion 31 is upwardly and outwardly extended from the back edge of the base portion. As illustrated in FIG. 2, the deflecting portion is positioned between the mounting flange regions of the base portion. The deflecting portion is extended at an obtuse angle from the base portion. Preferably, the obtuse angle the deflecting portion is extended from the base portion is between 100 degrees and about 170 degrees. Ideally, the obtuse angle the deflecting portion is extended from the base portion is about 135 degrees.

The deflecting portion has substantially flat front and back faces 32,33, an upper edge 34 and a pair of side edges 35,36. The upper edge of the deflecting portion preferably lies in a plane extending generally parallel to the base portion. One of the side edges of the deflecting portion is positioned adjacent one of the mounting flange regions of the base portion. The other side edge of the deflecting portion is positioned adjacent the other mounting flange region of the base portion.

In use, Ideally, the upper edge of the deflecting portion is ideally designed for generally lie in a common plane with the top of the light bar when the air deflector is mounted to the roof of the vehicle to insure that the front profile of the light bar is blocked by the deflector portion.

Preferably, the front face of the deflecting portion has an upper tapered region 37 adjacent the upper edge of the deflecting portion converging towards the back face of the deflecting portion. The upper tapered region of the deflecting portion is extended at an acute angle from the back face of the deflecting portion. In a preferred embodiment, the acute angle the upper tapered region of the deflecting portion is extended from the back face of the deflecting portion is between about 5 degrees and about 60 degrees. In an ideal embodiment, the acute angle the upper tapered region of the deflecting portion is extended from the back face of the deflecting portion is between about 45 degrees.

In the preferred embodiment, at least one generally triangular support rib 38 is downwardly extended from the back face of the deflecting portion. The support rib has a bottom side 39 generally lie in a common plane with the bottom face of the base portion. In use, the support rib is designed for providing structural support to the deflecting portion. Ideally, the support rib has a back side 40 extending at an obtuse angle to the bottom side of the support rib for providing optimal support strength.

The base portion, the deflecting portion, and the support rib comprise a translucent material to permit light from the light bar to shine through the air deflector. Ideally, the base portion, the deflecting portion, and the support rib comprise a generally transparent material to maximize the amount of light from the light bar that can shine through the air deflector, As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An air deflector for mounting to a roof of a vehicle in front of a light bar mounted to the roof of the vehicle, said air deflector comprising:

a base portion having top and bottom faces, a pair of opposite ends, and front and back edges extending between said ends of said base portion;

said bottom face of said base portion being adapted for mounting to the roof of the vehicle in front of the light bar mounted to the roof of the vehicle and extending between a pair of sides of the vehicle;

a deflecting portion being upwardly and outwardly extended from said back edge of said base portion;

said deflecting portion being extended at an obtuse angle from said base portion;

said deflecting portion having front and back faces, an upper edge and a pair of side edges;

wherein said base portion has a pair of outwardly and downwardly extending mounting flange regions, a first of said mounting flange regions being positioned adjacent a first of said ends of said base portion, a second of said mounting flange regions being positioned adjacent a second of said ends of said base portion; and wherein a free end of each of said mounting flange regions of said base portion has a mounting channel therein extending between said front and back edges of said base portion.

2. The air deflector of claim 1, wherein said top face of said base portion has a tapered region adjacent said front edge of said base portion and converging towards said bottom face of said base portion, said tapered region of said top face of said base portion and said bottom face of said base portion lying in planes defining an acute angle therebetween.

3. The air deflector of claim 2, wherein said acute angle defined between said planes of said tapered region of said top face of said base portion and said bottom face of said base portion is between about 5 degrees and about 45 degrees.

4. The air deflector of claim 2, wherein said bottom face of said base portion has a downwardly extending flared region adjacent said front edge of said base portion, said flared region of said bottom face and said tapered region of said top face converging together at said front edge of said base portion.

5. The air deflector of claim 4, wherein said flared region of said bottom face and said tapered region of said top face each have a width defined from said front edge of said base portion in a direction towards said back edge of said base portion, wherein said width of said tapered region of said top face is greater than said width of said flared region of said bottom face.

6. The air deflector of claim 1, further comprising an adhesive strip being provided on said bottom face of said base portion and extending between said ends of said base portion, said adhesive strip being adapted for adhesively attachment to a surface.

7. The air deflector of claim 1, wherein said mounting flange regions each are extended at an obtuse angle to said base portion.

8. The air deflector of claim 1, wherein said mounting channels each are generally U-shaped and having a spaced apart pair of generally straight sides and an arcuate middle portion connecting the associated sides of the respective mounting channel together, said sides of each mounting channel being extended substantially parallel to each other, said sides of said mounting channel lying in planes extending substantially parallel to said top and bottom faces of said base portion in the adjacent associated mounting flange region, each of said sides of each mounting channel having a depth defined between the associated end of the base portion and the associated middle portion of the respective mounting channel, wherein the depth of one side of each mounting channel is greater than the depth of the other side of the respective mounting channel.

9. The air deflector of claim 1, further comprising at least one generally triangular support rib being downwardly extended from said back face of said deflecting portion.

10. The air deflector of claim 9, wherein said support rib has a bottom side generally lying in a common plane with said bottom face of said base portion.

11. The air deflector of claim 10, wherein said support rib has a back side extending at an obtuse angle to the bottom side of the support rib for providing optimal support strength.

12. The air deflector of claim 1, wherein said base portion and said deflecting portion comprise a translucent material.

13. A light bar air deflector system, comprising:
   a vehicle having a front, a rear, a pair of sides, a generally horizontal roof, and a light bar mounted to the roof of the vehicle and extending between the sides of the vehicle;
   an air deflector comprising:
      a base portion having substantially flat top and bottom faces, a pair of opposite ends, and front and back edges extending between said ends of said base portion;
      said top and bottom faces of said base portion lying in generally parallel planes to one another;
      said top face of said base portion having a tapered region adjacent said front edge of said base portion and converging towards said bottom face of said base portion;
      said tapered region of said top face of said base portion and said bottom face of said base portion lying in planes defining an acute angle therebetween, wherein said acute angle defined between said planes of said tapered region of said top face of said base portion and said bottom face of said base portion is between about 5 degrees and about 45 degrees;
      said bottom face of said base portion having a downwardly extending flared region adjacent said front edge of said base portion, said flared region of said bottom face and said tapered region of said top face converging together at said front edge of said base portion;
      said flared region of said bottom face and said tapered region of said top face each having a width defined from said front edge of said base portion in a direction towards said back edge of said base portion;
      said width of said tapered region of said top face being greater than said width of said flared region of said bottom face, wherein said width of said tapered region of said top face is at least three time greater than said width of said flared region of said bottom face;
      said bottom face of said base portion being mounted to the roof of the vehicle in front of the light bar and extending between the sides of the vehicle, one of said ends of said base portion being positioned adjacent one of the sides of the vehicle and the other of said ends of said base portion being positioned adjacent the other of the sides of the vehicle;
      an adhesive strip being provided on said bottom face of said base portion and extending between said ends of said base portion, said adhesive strip adhesively attaching the base portion to the roof of the vehicle;
      said base portion having a pair of outwardly and downwardly extending mounting flange regions, a first of said mounting flange regions being positioned adjacent a first of said ends of said base portion, a second of said mounting flange regions being positioned adjacent a second of said ends of said base portion;
      said mounting flange regions each being extended at an obtuse angle to said base portion;
      a free end of each of said mounting flange regions of said base portion having a mounting channel therein extending between said front and back edges of said base portion;
      each of said mounting channels being receiving therein a portion of a window jam of the adjacent side of the vehicle;
      said mounting channels each being generally U-shaped and having a spaced apart pair of generally straight sides and an arcuate middle portion connecting the associated sides of the respective mounting channel together;
      said sides of each mounting channel being extended substantially parallel to each other, said sides of said mounting channel lying in planes extending substantially parallel to said top and bottom faces of said base portion in the adjacent associated mounting flange region;
      each of said sides of each mounting channel having a depth defined between the associated end of the base portion and the associated middle portion of the respective mounting channel;
      wherein the depth of one side of each mounting channel is greater than the depth of the other side of the respective mounting channel;
      each of said mounting flange regions having a pair of bores extending into the associated mounting channel from said top face of said base portion;
      each of said bores having a threaded fastener extended therethrough into the associated mounting channel;
      a deflecting portion being upwardly and outwardly extended from said back edge of said base portion, said deflecting portion being positioned between said mounting flange regions of said base portion;
      said deflecting portion being extended at an obtuse angle from said base portion;
      said deflecting portion having substantially flat front and back faces, an upper edge and a pair of side edges;
      said upper edge of said deflecting portion lying in a plane extending generally parallel to said base portion;
      one of said side edges of said deflecting portion being positioned adjacent one of said mounting flange regions of said base portion, the other of said side edges of said deflecting portion being positioned adjacent the other of said mounting flange regions of said base portion;
      said front face of said deflecting portion having an upper tapered region adjacent said upper edge of said deflecting portion converging towards said back face of said deflecting portion;

said upper tapered region of said deflecting portion being extended at an acute angle from said back face of said deflecting portion;

at least one generally triangular support rib being downwardly extended from said back face of said deflecting portion, said support rib having a bottom side generally lying in a common plane with said bottom face of said base portion; and wherein said base portion, said deflecting portion, and said support rib comprise a translucent material.

* * * * *